Patented May 19, 1936

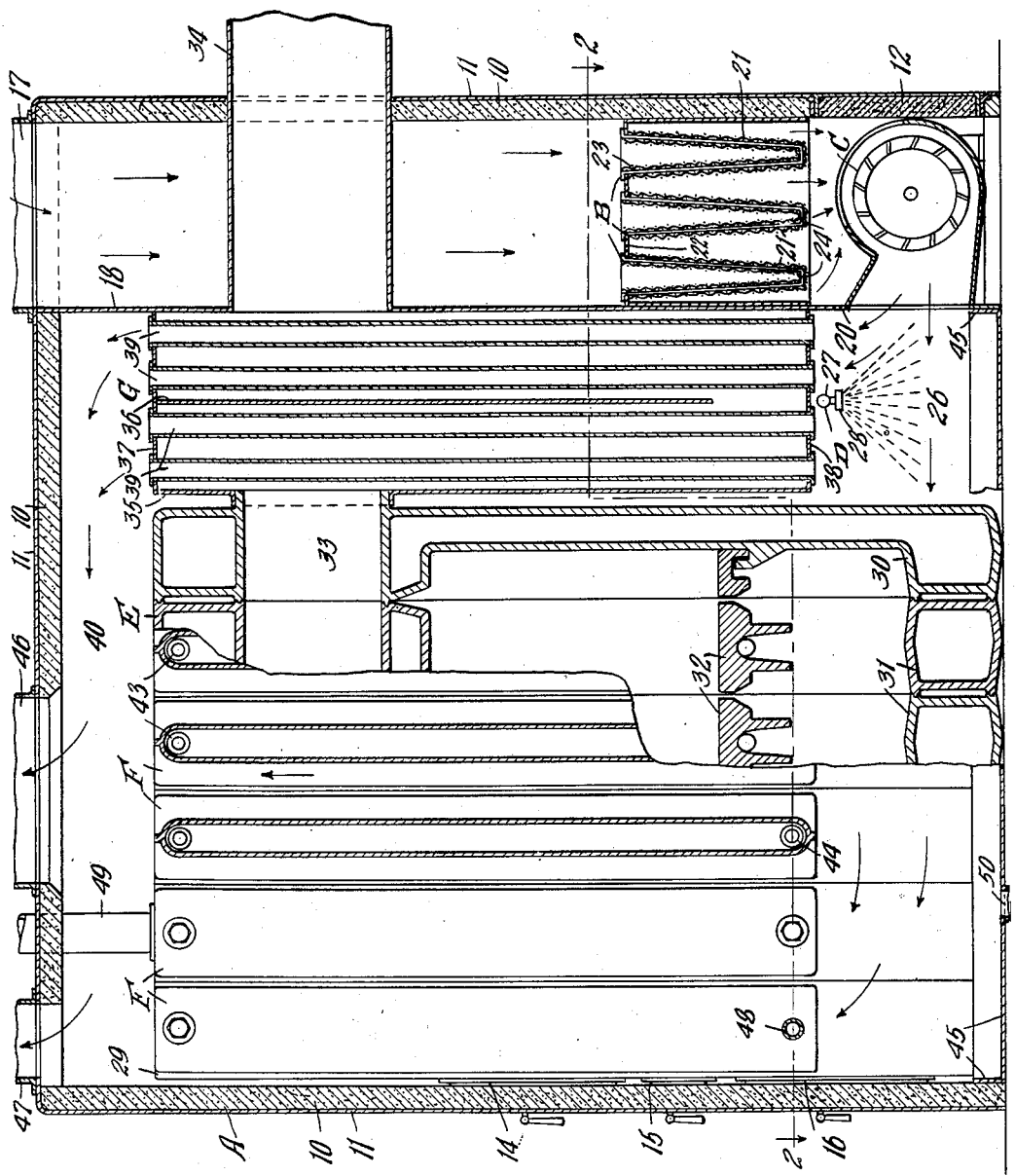

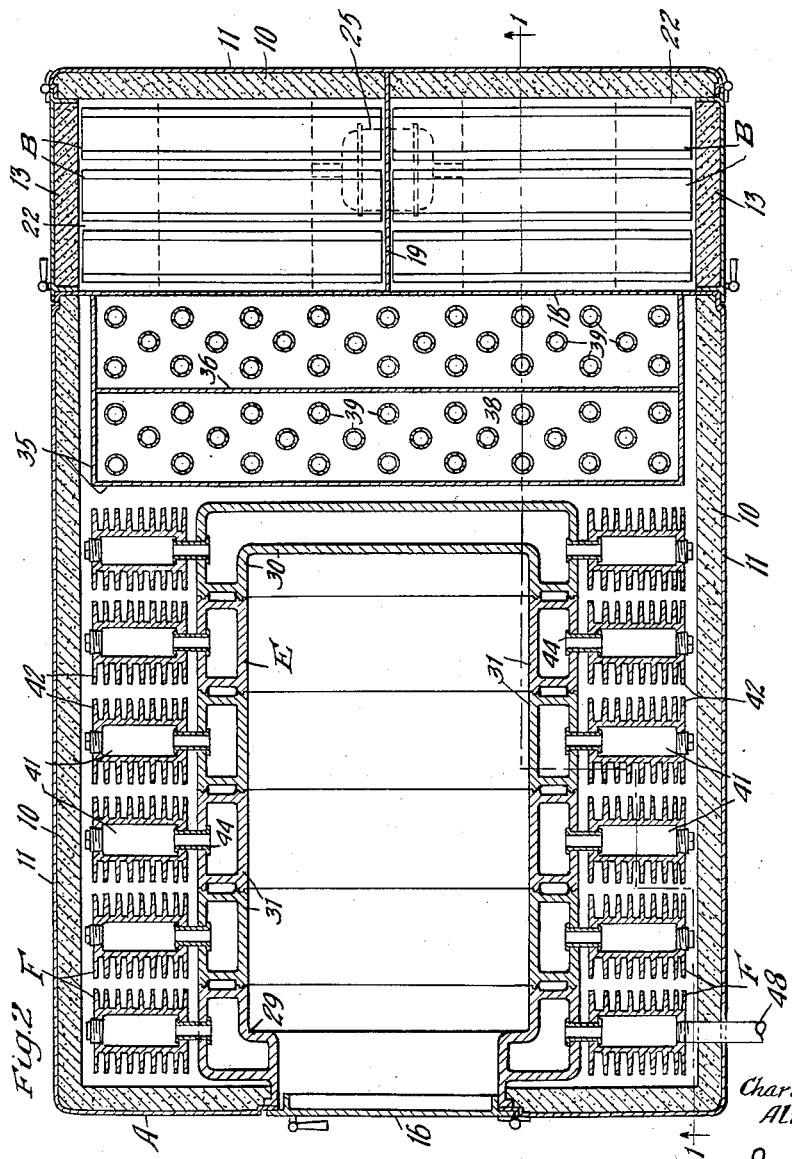

2,040,920

UNITED STATES PATENT OFFICE 2,040,920

UNITARY AIR CONDITIONER

Charles Christofferson and Alfred G. Wahlberg, Duluth, Minn.

Application May 12, 1933, Serial No. 670,726

3 Claims. (Cl. 126—101)

This invention relates to improvements in unitary air conditioner.

One object of the invention is to provide, in a single unit, efficient and economical means for completely conditioning air under variable conditions and during all seasons of the year, for schools and other public buildings, stores, private dwellings and the like.

More specifically, an object of the invention is to provide a unitary air conditioner wherein means are provided for removing all dirt, dust, and other foreign matter and, when desired, to chemically treat the air for removal of bacteria and/or impart a desirable odor thereto; means for humidifying the air when conditions render the same desirable; means to heat the air by bringing the same into contact with large heating areas at moderate temperatures so as to prevent devitalization of the air; and, alternatively when heating of the air is not required, to utilize said last named means for cooling the air when and as the latter is desirable.

More specifically, an object of the invention is to provide within a single casing, means in the form of a boiler which may be utilized for either heating or cooling air passing the same in contact therewith in combination with means also within the casing, for filtering and/or treating the air and for humidifying the air when this is desired.

Other objects of the invention will more clearly appear from the description and claims hereinafter following.

In the drawings forming a part of this specification, Figure 1 is a vertical sectional view of the improved unitary conditioner, the section corresponding substantially to the broken section line 1—1 of Figure 2 and certain parts being broken out to more clearly illustrate certain features of the construction. And Figure 2 is a horizontal sectional view corresponding substantially to the line 2—2 of Figure 1.

In said drawings, the air conditioner comprises, broadly, a main casing A; air filters B; fans C; a humidifier D; a boiler E; radiating units F—F; and a heat economizer G.

The casing A, as shown, is preferably of rectangular outline and of suitable size to properly house the component parts of the system. Preferably, the casing A will have walls of insulating material 10 with an outside metal sheathing 11, the latter being finished in any suitable or desired manner to accord with the aesthetic tastes of the user. The casing also will be provided with suitable access doors for the various parts, certain of said doors being indicated at 12, 13, 14, 15, and 16 for the purposes hereinafter described. At its top and preferably at the rear, the casing is provided with an inlet opening 17 for the return of incoming air from the return registers of the building, said inlet delivering the air into a rear vertical chamber defined by a vertical transverse partition 18, said chamber being preferably subdivided into two side by side sub-chambers by means of a sub-partition 19 extending between the partition 18 and the rear vertical wall of the casing, as best indicated in Figure 2. As clear from Figure 1, the partition 18 terminates above the bottom or floor line as indicated at 20 so as to provide passage for the air from the rear sub-chambers into the space forward of the partition 18.

Disposed within each of the said sub-chambers, is a filter B which, as shown, may be briefly described as comprising a plurality of truncated and tapered four sided pyramid screen holders 21—21 suitably mounted in a frame-work or support 22; and a plurality of correspondingly shaped nested mesh screen vertically removable retainers 23—23. Each set of holders and retainers 21 and 23 are so proportioned as to leave a uniform spacing between the several opposed walls thereof within which spacing is received and held a filter medium 24. For a more detailed description of the construction of said air filter, reference may be had to the co-pending application of Charles Christofferson, Serial No. 638,046, filed October 17, 1932.

In carrying out the present invention, the filter medium 24 will preferably be comprised of two or more plies or sheets of cotton batting which will effectively mechanically remove or filter out solid foreign particles of dust, dirt and the like. Also, it is contemplated to chemically treat said filter medium in various ways as, for instance, to incorporate chemicals that will destroy various types of bacteria that may be present in the air; to incorporate various other chemicals having a medicinal value where the air conditioner is used in hospitals, sanitariums and the like; and to incorporate chemicals that will neutralize unpleasant odors or impart desirable odors. As will be understood, a wide variety of chemicals may be employed for impregnating the filter material for the purposes above indicated and others so that as the air is passed through the filter, the air will be treated and/or permeated to attain the desired results.

Preferably below the filters B are two fans, one at each side, the same being indicated conventionally in the drawing at C of the multi-blade type, the two fans being preferably operated from a common motor 25 interposed between the fans and located below the sub-partition 19, as indicated in Figure 2. The fans and motor will preferably be mounted on sound-proof bases and thermostatically automatically controlled.

As the air is drawn downwardly through the filters by the fans and delivered from the latter, it passes through the bottom openings in the partition 18 and is then delivered into a chamber indicated at 26 which, for convenience, may be termed the humidifying chamber. At the top of this chamber is indicated conventionally, the humidifier D which preferably will comprise a transversely extending pipe 27 and down spray nozzles 28. In actual practice, said humidifier will be connected to the domestic water supply with an automatically controlled valve incorporated therein, adapted to be opened and closed by an electrically operated humidistat (not shown) in accordance with the amount of moisture present in the air at any given time.

Referring next to the boiler E, the same is shown of the hot water type but, as will be obvious to those skilled in the art, a steam boiler may be employed. As shown, the boiler E is comprised of a front water chambered section 29, a rear water chambered section 30, and a plurality of intermediate transversely extending water chambered sections 31—31, all suitably connected to provide water communication in a well known manner. As shown in Figure 1, the boiler is provided with a plurality of grate bars 32—32, adapting the boiler to be heated by coal or other solid fuel in a well known manner. The usual feed, clinker and ash pit doors are indicated at 14, 15, and 16, respectively, heretofore referred to. While the boiler is shown as adapted to be heated by solid fuel, it will be obvious that other types of fuel or heating means may be employed, such as an oil burner, gas or electricity without departing from the spirit of the invention. The boiler E, as will be understood, will be provided with the usual flue passages and the products of combustion delivered ultimately through the outlet passage 33 into the heat economizer G and from the latter to the smoke pipe 34 which passes outwardly through the rear wall of the casing. As will also be understood by those skilled in the art, various types of boilers may be employed other than the cast sectional boiler shown, such as steel boilers.

The economizer G may be of any suitable or desired type, the one shown comprising a rectangular sheet metal casing 35 extending substantially the full width of the outer main casing A and having therein a transversely extending vertical baffle wall 36. Between the top and bottom walls 37 and 38 of the economizer extend a plurality of air tubes 39 around which obviously will circulate the products of combustion from the boiler in the passage from the boiler to the smoke pipe 34. As will be apparent, part of the air which enters the humidifying chamber 26, will pass directly up through the tubes 39 and be thereby heated and then delivered into the warm air chamber 40 at the top of the air conditioner unit.

The radiating units F are shown all of like construction and preferably two of said units will be attached to each of the sections of the boiler, one to each side leg of each section, as shown. Each unit F is preferably in the form of an iron casting, although obviously the same may be made of other material such as aluminum, copper, brass, bronze or alloy and each consists of a main, vertically extending water chambered section 41 of rectangular outline and a plurality of integral, vertically extending radiating fins 42—42. Each of said units F extends preferably from the top of the boiler to a point about a foot above the floor line so as to leave below the bottoms of said units, a horizontal passageway for the air, as will be understood. Each of said units F is placed in water communication with the boiler by suitable upper and lower connections 43 and 44, which connections may be either in the form of tubes, nipples or the like. Along each side of the boiler on the floor and extending from the front wall of the casing A back to the line of the partition 18, are removable drip pans 45 for the purpose hereinafter described.

Warm air supply or outlet pipes from the warm air chamber 40 are indicated at 46 and 47 which, as will be understood, are adapted to conduct the conditioned air to the various inlet registers of the several rooms of the building.

Water is supplied to the boiler through pipe 48, preferably to the bottom of the front unit F, as indicated in Figure 1. At 49 is indicated the outlet water pipe of the boiler which, when desired, may be utilized for supplying hot water (and steam when the boiler is a steam boiler) to radiators of the building. Said pipe 49 will also be connected to the sewer or a water circulating system, with suitable valve controls, for the purpose hereinafter described for use when the air conditioner is functioning to cool the air rather than heat it. As will be understod, the boiler when of the hot water type, will be suitably connected to an expansion tank or pressure regulator and, if of the steam type, will be provided with the usual attachments common to steam boilers.

The operation of the air conditioner is as follows, assuming first a season of the year when the air is to be heated. Under these conditions, the boiler will obviously be fired and the water in the several chambered sections thereof and the radiating units F, freely circulated. The incoming air, after being passed through the filter and delivered into the humidifying chamber 26, will there be sprayed as may be required, part of the air then passing upwardly directly through the economizer G, as previously described. The balance of the air will be delivered from the chamber 26 along the lower sides of the boiler beneath the units F and thence pass upwardly in contact with the side walls of the boiler and all of the surfaces of the finned units F and ultimately delivered into the warm air chamber 40. As the cooler air rises upwardly alongside the boiler and units F in the vertical passages defined between the side walls of the casing A and boiler, it will be gradually heated with a corresponding abstraction of heat units from the water in the several chamber sections, the water then circulating downwardly through the units F and into the bottoms of the boiler sections, whence it is heated from the interior and rises to continue the circulation. It will be observed that a very large area of radiating surfaces is thus presented to the moving current of air and that the temperature of all of these radiating surfaces is comparatively low and the air is prevented from coming into contact with any directly heated surface, that is, there is always a body of water between the source of heat and the air to be heated. In this manner, the air is prevented from being over heated or scorched and hence, is delivered to the rooms not only properly filtered and humidified but in its natural invigorating condition.

In other seasons of the year when cooling of the air is desired, the air flow is the same as above described but ordinarily the humidifier D will not be functioning since the air will generally contain the proper or even an excess of moisture. Under these cooling conditions, there being no source of heat employed, water is freely circulated through the boiler, thus supplying a constant source of cold water in the water chambers of the boiler sections and units F so that, as the air rises in contact with the radiating surfaces, the air is cooled to the desired amount and any excess of moisture will be condensed and drip down to the pans 45, the latter also obviously serving to receive any surplus water that may result from the use of the humidifier D at any time. In certain instances, the domestic cold water supply may be utilized, in which event the circulating water is passed off through the pipe 49 and to the sewer as hereinbefore described. In other cases it may be desirable to employ a refrigerated water circulating system in which case a closed circuit will be formed between the cold water inlet supply pipe 48 and outlet pipe 49 with the circulating pump and refrigerating means included therein. In the cooling of the air, it will be noted that the air does not come into any direct contact with any water so that the air is prevented from becoming over saturated and uncomfortable. When a steam boiler is employed, additional connections between the units F and the boiler sections will be made below the upper nipples 43 and so located as to come below the water line of the boiler and thereby provide steam chambers for indirect steam heating at the tops of the units F, as will be understood. Also, if desired, the drip pans 45 may be provided with a suitable drainage outlet 50 for delivery of the moisture and the collected water to a sewer.

Although the preferred embodiment of the invention has herein been shown and described, it is obvious that various changes and modifications may be made without departing from the spirit of the invention and all such changes and modifications are contemplated that come within the scope of the following claims.

What is claimed is:

1. In a unitary air conditioner, the combination with a boiler; of a plurality of radiating water chambered units on the exterior of and communicating with said boiler; a heat economizer having a lower air inlet and associated with the boiler; an air filter; a partition between the economizer and filter; and a casing enclosing said boiler, units, filter, partition and economizer, said casing and partition forming a passage for conducting air through the filter, and delivering it adjacent the lower inlet end of the economizer, the casing and boiler forming additional passages farther from the partition whereby part of the air, after passing the filter, passes upwardly through the economizer and part up alongside the boiler in contact with said units.

2. In a unitary air conditioner, the combination with a sectional boiler; of a heat economizer associated with the boiler; a plurality of water chambered finned units, each unit being in water communication with a boiler section and disposed on the outer side thereof; an air filter; humidifying means disposed adjacent the bottom of the economizer; and a heat insulated casing enclosing said boiler, units, economizer, humidifying means and filter, said casing having an inlet opening and an outlet opening and a partition for defining a passage for conducting the air from the inlet opening first through the filter, thence in proximity to the humidifying means, the casing, boiler and economizer being further so related that the air is passed thence partly through the economizer and partly in contact with the finned units for ultimate delivery to the outlet opening.

3. In a unitary air conditioner, the combination with a boiler; of a heat economizer associated with the boiler; a plurality of water chambered radiating units, each being in independent water communication with the boiler and disposed on the outer side of the latter; an air filter humidifying means disposed adjacent the bottom of the economizer; and a casing enclosing said boiler, units, economizer, humidifying means and filter, said casing having an inlet opening, an outlet opening and a partition for defining a passage for conducting the air from the inlet opening first through the filter, then in proximity to the humidifying means, the casing, boiler and economizer being further so related that the air is passed thence partly through the economizer and partly in contact with the radiating units for ultimate delivery to the outlet opening.

CHARLES CHRISTOFFERSON.
ALFRED G. WAHLBERG.